Jan. 26, 1943.  L. L. GRENEKER  2,309,447
DISPLAY DEVICE AND METHOD OF MAKING THE SAME
Filed Dec. 11, 1940  2 Sheets-Sheet 1
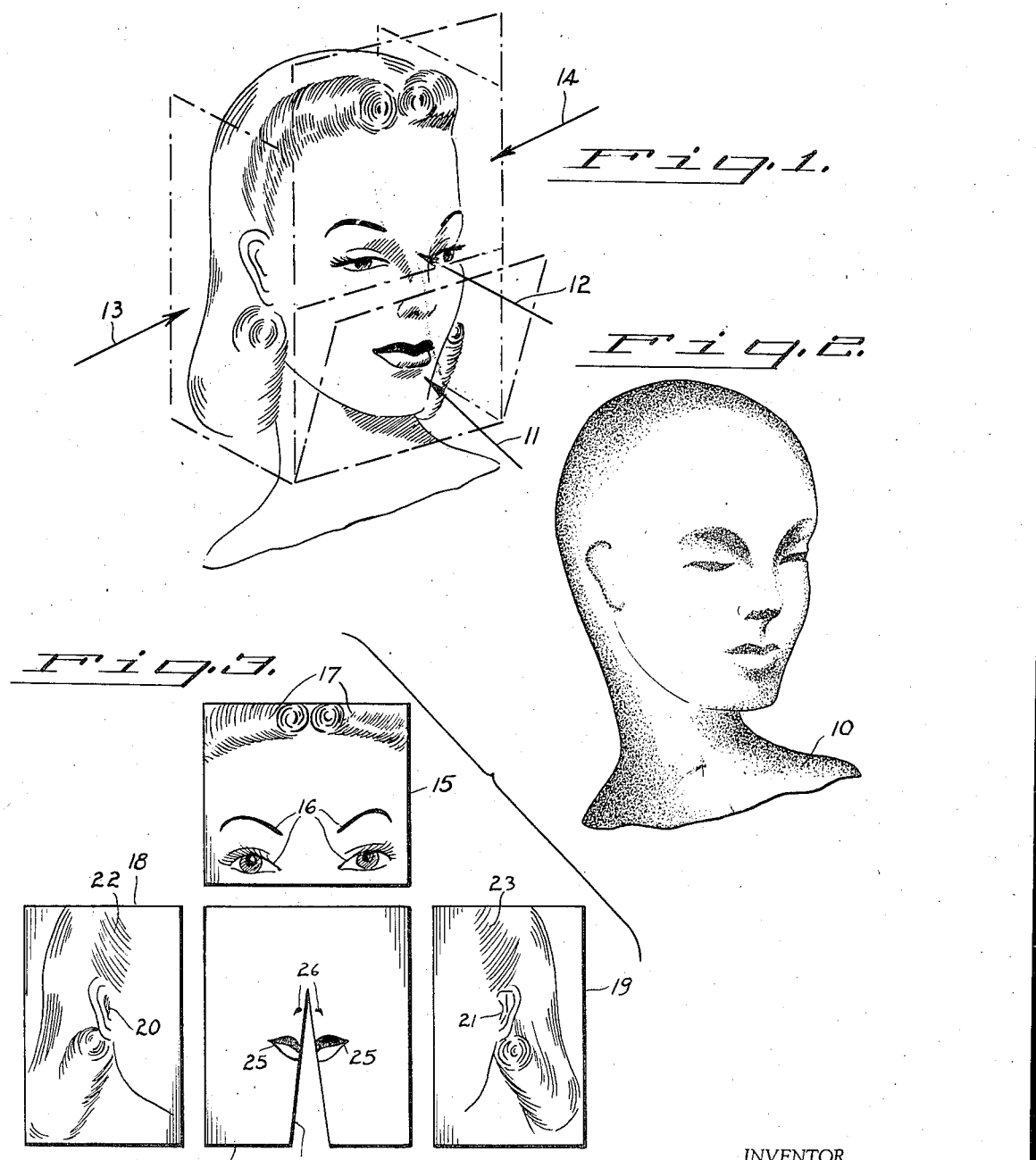
INVENTOR.
LILLIAN L. GRENEKER.
BY
ATTORNEYS.

Jan. 26, 1943. L. L. GRENEKER 2,309,447
DISPLAY DEVICE AND METHOD OF MAKING THE SAME
Filed Dec. 11, 1940 2 Sheets-Sheet 2
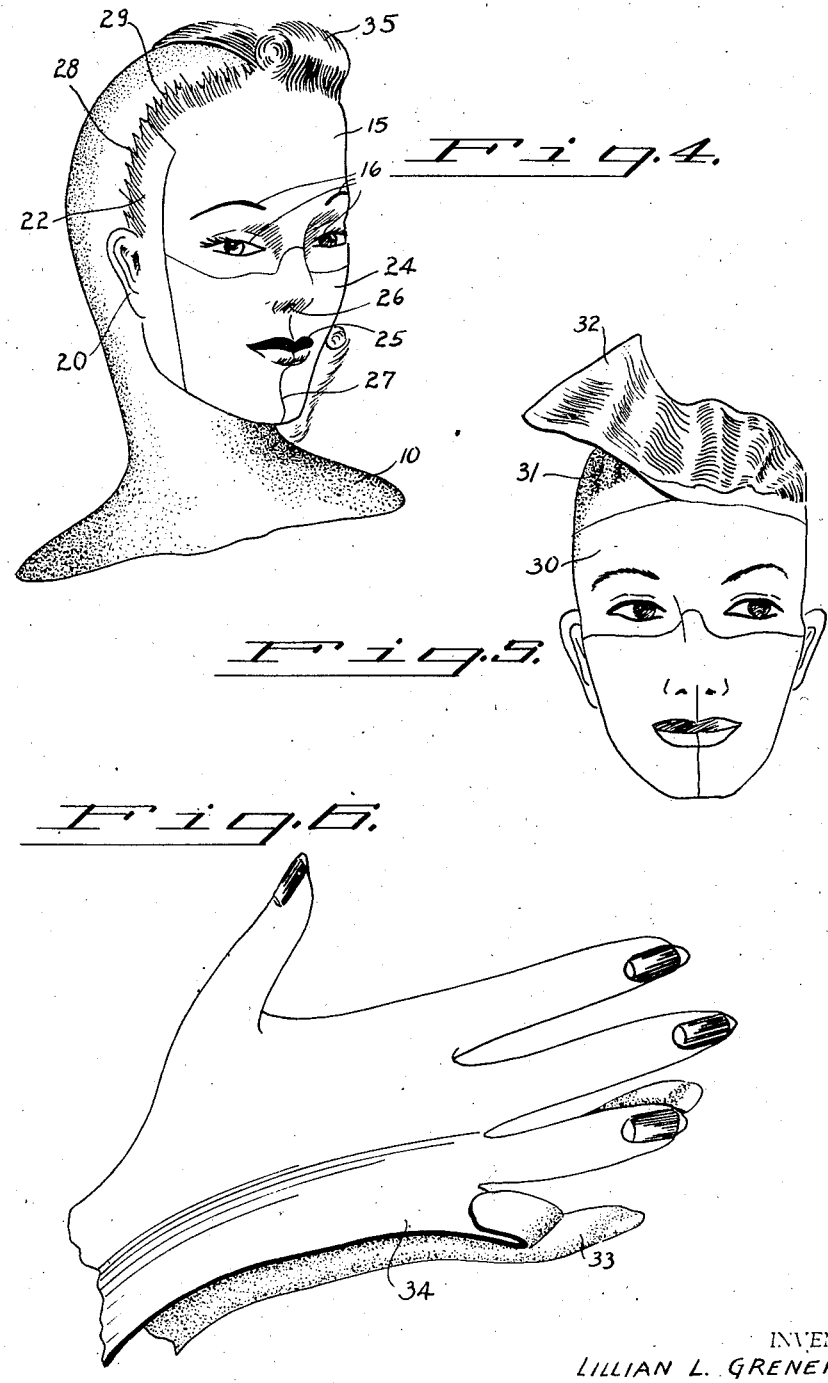
INVENTOR.
LILLIAN L. GRENEKER,
BY
Gluck + Breitenfeld
ATTORNEYS.

Patented Jan. 26, 1943

2,309,447

UNITED STATES PATENT OFFICE 2,309,447

DISPLAY DEVICE AND METHOD OF MAKING THE SAME

Lillian L. Greneker, New York, N. Y.

Application December 11, 1940, Serial No. 369,548

4 Claims. (Cl. 41—10)

My present invention relates generally to display devices, and has particular reference to the type of display form that simulates the human body and is used in store windows, in show rooms, and similar places.

A general object of the invention is to provide a display form which constitutes a three-dimensional likeness of a known person.

From a broader aspect, my invention relates generally to the production of a three-dimensional likeness of any living subject, whether the likeness is used for display purposes or not.

Where the invention is employed for its primary purpose, i. e., for the production of a display form or manikin, it is generally a popular actor or actress, or a similar noted personage, whose features are chosen for reproduction. Depending upon the purpose for which the display is to be used, it may take the form of a complete human figure, or it may be restricted to the head portion, or possibly to other limited portions of the body. The display form may be of life size, which is preferable, or it may be, if desired, of reduced or enlarged dimensions relative to the actual dimensions of the living subject.

In accordance with my invention, a model or base structure is first formed whose exterior surface conforms substantially to the general contours of the living subject. This base structure may take the form of a hollow paper or cardboard unit of conventional character, or it may be composed of any other selected material and may be constructed in any desired manner.

Onto the surface of at least a portion of this structure I then apply a skin-like covering composed of flexible material, this material having previously been caused to carry photographic imprints of selected distinctive features of the subject, and being fitted to the base structure so that these photographic imprints are brought into substantial registry with the corresponding contours of the base structure. In this way, the external surface of the base structure is embellished in a life-like manner which would be difficult to achieve by the art of sculpture alone, or by attempting to paint the base structure by hand.

I achieve the foregoing objects and such other objects as may hereinafter appear or be pointed out, in the manner illustratively exemplified in the accompanying drawings, in which:

Figure 1 is a perspective view of the head portion of a living subject, showing one illustrative manner in which certain distinctive features may be photographed;

Figure 2 is a perspective view of a model or base structure forming part of a display device of the present type;

Figure 3 is a plan view of flexible sheet material upon which certain photographs have been imprinted;

Figure 4 is a view similar to Figure 2 with the flexible material of Figure 3 applied to the base structure, and indicating certain additional procedural steps;

Figure 5 is a perspective view of another display form constructed in accordance with the present invention and illustrating a modification; and Figure 6 is a perspective view of still another display form constructed in accordance with the present invention and shown in course of completion.

To explain the nature of my invention, I have chosen to illustrate in Figures 1-5 the manner in which a display form may be produced to constitute a three-dimensional likeness of the head portion of a living subject.

One of the first steps is to produce a model or base structure of the character indicated in Figure 2. My invention is not concerned with the manner in which the model of Figure 2 is produced, nor with the material of which it is composed. By way of example, one feasible procedure lies in first engaging the services of a sculptor to produce a sculpture for which the subject poses. This sculpture is then utilized in the conventional way in the creation of one or more hollow plaster molds, whose interior contours conform to the general contours that are ultimately desired. By means of such a hollow mold, a hollow paper or cardboard structure can be produced, by lining the mold with paper patches impregnated with adhesive, and ultimately removing the integrated dried unit from the mold. The external contours of this paper or cardboard model or base structure will thus conform substantially to the general contours of the living subject. Such a base structure is illustrated in Figure 2, and is designated generally by the reference numeral 10.

In the case of the display form whose production is described in connection with Figures 1-4, the scalp portion of the model 10 is left substantially smooth, since the completion of the device involves the employment of a suitable head-dress presently to be described.

Independently of the creation of the model or base structure of Figure 2, the living subject is posed before a camera to enable selected distinctive features to be photographed. In the case of a head, such as that shown in Figure 1, it has been found in practice that the most distinctive features include the eyes and eyebrows, the nostrils, the lips, and in some cases the ears and hairline. To illustrate the general nature of my invention, I have assumed, in the present case, that all of these features are important and distinctive, and for this reason I have indicated how the subject of Figure 1 would be photographed along four different directions. One direction is indicated by the arrow 11 and is aimed at the mouth and nostrils of the subject. Another photograph is taken along the direction indicated by the arrow 12, and is aimed at the eyes and eyebrows. A third photograph is taken along the direction 13, aimed at the right ear and the hairline adjacent to it. A similar photograph is taken along the direction 14, since the opposite ear and opposite hairline are assumed to be different and distinctive.

These photographs are then imprinted upon flexible sheet material, such as paper or fabric, that has been suitably treated to receive photographic impressions. The sizes of these photographic imprints will depend upon the size of the base structure 10. If the latter is life size, then the photographic imprints are also of life size. If the base structure is of smaller or larger proportions, then the photographic imprints are correspondingly reduced or enlarged.

The flexible material is preferably composed of fabric, and it may be in the form of a single element of suitable configuration, or it may be in the form of separate elements such as those illustrated in Figure 3. The particular shapes which these elements are to have when printed, or to which they may be ultimately cut, is a matter that has to be left to the judgment of the person who is to fit them to the base structure, as indicated in Figure 4. I have illustratively shown a piece 15 on which there are formed the photographic imprint 16 of the eyes and eyebrows and the photographic imprint 17 of the hairline; pieces 18 and 19 on which there are formed photographic imprints, respectively, of the right and left ears 20 and 21 and the hairlines 22 and 23 adjacent to these regions; and a piece 24 on which there are formed the photographic imprints 25 and 26 of the mouth and nostrils. I have shown the piece 24 provided with a recess or gore 27, with the photographic imprint 25 and 26 printed in two parts, as indicated in Figure 3, so that one half lies on one side of the recess 27, while the other half lies on the other side of this recess.

The pieces of flexible material are then fitted and adhesively secured to the surface of the model 10 so that the various photographic imprints are brought into substantial registry with the corresponding contours of the model. That is, the photographic imprint of the mouth is made to lie directly over and in proper registry with the mouth portion of the base structure, the photographic imprint of the eyes is made to coincide with the corresponding eye region of the base structure, and so on. This is indicated in Figure 4. It will be observed that the two edges of the recess 27 of the piece 24 are brought into abutment along a central line which extends from the tip of the nose to the neck. In a similar fashion, the other pieces are fitted to the base structure, and in doing so, they are cut and shaped, where necessary, so that all edges can be brought into smooth abutment to form a continuous skin-like covering. The particular manner in which these pieces are cut or fitted is not material from the standpoint of the present invention and is a procedure that can be left to the judgment and skill of the operator. The essential point is the fact that each photographic imprint is brought into substantial registry with the corresponding contours of the base structure.

The joints that are produced in various regions, of which the joint 27 is typical, are less conspicuous than one would be led to believe, especially if skillfully produced. However, if desired, the appearance of these joints or seams may be further subdued by the judicious application of pigments or the like.

In the structure shown in Figures 2–4, the likeness is completed by securing to the model a suitable head-dress which conceals the adjacent edges of the sheet material. This head-dress may take the form of a hat, a turban, or the like, or it may be composed in part or entirely of artificial hair. Preferably, the pieces 18 and 19 are cut so as to form deep gashes in their edges along the photographic imprints of the hairlines 22 and 23, as indicated at 28 in Figure 4. Similar gashes 29 may be formed in the lateral regions of the photographic imprint of the hairline 17. Masses of hair 35, in simulation of the coiffure of the living subject, are then adhesively applied to the base structure 10, and are suitably worked into the gashes 28 and 29 so as to appear to merge with the hair depicted in the photographic imprints of the hairline. The ears and hairline are thus photographically identical with the corresponding portions of the living subject, and a striking likeness is achieved in these regions of the display device.

In Figure 5, I have shown a manner in which the hair itself may, if desired, be depicted by photographic means. In this case, the living subject is a man's head, and the base structure 30 includes a scalp portion 31 which has been caused to conform in contour to the external contours of the hair on the living subject. In addition to other angles along which photographs are taken, a photograph is taken, in this case, directly from the top of the subject. This photographic imprint is formed on an element of flexible sheet material 32, and this element is ultimately fitted to and adhesively secured to the base structure 30 so that the photographic imprint is in substantial registry with the corresponding contours of the model. The formation of the skin-like covering on the other regions of the head of Figure 5 is substantially the same as hereinbefore described in connection with Figures 2–4.

In each of the foregoing cases it will be understood that the display from may consist of the head portion alone, as shown in the present drawings, or it may consist of a complete figure, or any selected portion. The body portion of the figure, however, is not necessarily coated with a layer of sheet material that has been photographically treated.

The invention is obviously not restricted to the face and head portion of a subject. It may, under certain circumstances, be desirable to produce a three-dimensional likeness of other distinctive features of a known person. For example, the shape of a hand or of finger nails may be sufficiently distinctive to justify simulation. In such a case, a base structure 33 is first produced (see Figure 6) whose contours conform substantially to the contours of the living subject, (e. g., the hand of the known person); and a photographic imprint of the finger nails may then be formed on a sheet material 34 that is adhesively applied to the base structure 33.

Nor is the invention limited to the creation of three-dimensional likeness of humans. For example, the subject of the device may be a dog, horse, or other animal.

It will thus be seen that it is not my intention to produce, by photographic means alone, a three-dimenional likeness of a living subject. The base structure, in each case, is independently produced by some suitable means or process, and the present invention is directed primarily to the application, to this base structure, of a skin-like covering which bears photographic imprints of selected distinctive features of the subject. Strictly speaking, these photographic imprints become mere approximations the moment the sheet material is deflected from its normal plane. Nevertheless, these imprints, when fitted over the corresponding contours of the base structure in substantial registry therewith, produce an overall effect which is startling in its realistic character.

In general, it will be understood that those skilled in the art may make changes in the details herein described and illustrated without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is:

1. In the art of making a three-dimensional likeness of a living subject, the steps which consist in forming a model which conforms to the general contours of the subject, photographing the subject along selected different directions aimed at distinctive features of the subject, imprinting said photographs upon flexible sheet material, and then fitting and adhesively securing said sheet material to the surface of said model so as to bring the photographic imprints into substantial registry with the corresponding contours of the model.

2. In the art of making a three-dimensional likeness of the head of a living subject, the steps which consist in forming a model which conforms to the general contours of said head, photographing the head along selected different directions aimed at distinctive features of the head, imprinting said photographs upon flexible sheet material, then fitting and adhesively securing said sheet material to the surface of said model so as to bring the photographic imprints into substantial registry with the corresponding contours of the model, and completing the likeness by securing to the model a suitable head-dress which conceals the adjacent edges of said sheet material.

3. In the art of making a three-dimensional likeness of the head of a living subject, the steps which consist in forming a model which conforms to the general contours of said head, photographing the head along selected different directions aimed at distinctive features of the head, including at least a portion of the hair line, imprinting said photographs upon flexible sheet material, forming deep gashes in the edge of said material along the photographic imprint of said hair line, then fitting and adhesively securing said sheet material to the surface of said model so as to bring the photographic imprints into substantial registry with the corresponding contours of the model, and completing the likeness by securing to the model a suitable head-dress which includes masses of hair worked into said gashes so as to appear to merge with the hair depicted in the photographic imprint of the hair line.

4. In a display manikin, a head portion intended to constitute a three-dimensional likeness of a living subject, said head portion comprising a base structure whose external contours conform to the general contours of the subject, and a skin-like covering adhesively secured over the surface of at least a portion of said base structure, said covering being formed of flexible sheet material bearing photographic imprints of selected distinctive features of the subject, including at least a portion of the hair line, said sheet material being fitted to the base structure with the photographic imprints in substantial registry with the corresponding contours of said base structure, and a head-dress including masses of hair arranged so as to appear to merge with the hair depicted in the photographic imprint of the hair line.

LILLIAN L. GRENEKER.